(12) United States Patent
Berini et al.

(10) Patent No.: US 10,348,723 B2
(45) Date of Patent: Jul. 9, 2019

(54) METHOD FOR BIOMETRIC RECOGNITION OF A USER AMONGST A PLURALITY OF REGISTERED USERS TO A SERVICE, EMPLOYING USER LOCALIZATION INFORMATION

(71) Applicant: UNICREDIT S.p.A., Rome (IT)

(72) Inventors: Marco Berini, Massa Carrara (IT); Riccardo Prodam, Milan (IT)

(73) Assignee: UNICREDIT S.p.A., Rome (IT)

( * ) Notice: Subject to any disclaimer, the term of this patent is extended or adjusted under 35 U.S.C. 154(b) by 174 days.

(21) Appl. No.: 15/102,806

(22) PCT Filed: Dec. 11, 2013

(86) PCT No.: PCT/IT2013/000345
§ 371 (c)(1),
(2) Date: Jun. 8, 2016

(87) PCT Pub. No.: WO2015/087359
PCT Pub. Date: Jun. 18, 2015

(65) Prior Publication Data
US 2016/0315936 A1     Oct. 27, 2016

(51) Int. Cl.
*H04L 9/32*         (2006.01)
*G06F 21/32*        (2013.01)
(Continued)

(52) U.S. Cl.
CPC .......... *H04L 63/0861* (2013.01); *G06F 21/32* (2013.01); *G06K 9/00979* (2013.01);
(Continued)

(58) Field of Classification Search
None
See application file for complete search history.

(56) References Cited

U.S. PATENT DOCUMENTS 6,505,193 B1 *  1/2003  Musgrave ............... G06F 21/32
6,522,733 B1 *  2/2003  Cook .................... H04M 15/00
                                                  379/112.03
(Continued)

FOREIGN PATENT DOCUMENTS

EP      1 752 930 A2    2/2007
WO      01/40982 A2     6/2001
(Continued)

OTHER PUBLICATIONS

International Search Report and Written Opinion of the International Searching Authority for corresponding International Patent Application No. PCT/IT2013/000345 dated Oct. 7, 2014.
(Continued)

*Primary Examiner* — Jason Chiang
(74) *Attorney, Agent, or Firm* — Merchant & Gould P.C.

(57) ABSTRACT

A method for recognizing a person by identification codes derivable from biometric data includes registering a user, and recognizing a registered user, among registered users, through a recognition event. Each user registration event acquires user biometric data, encodes the data into a respective user's registration identification code, associates the code to the user, and registers the user and the associated code. Each recognition terminal is associated to a respective comparison set, including comparison identification codes corresponding to a registered user's identification code. Comparison identification codes are based on comparison between registered users' localization information and known localization of the recognition terminal. A user is recognized among registered users by a recognition event at a terminal. Each recognition event acquires biometric data from the user, which is encoded. The recognition identification code is compared with each of the comparison
(Continued)

identification codes. Recognition is recognized or refused based on estimated matching levels.

24 Claims, 4 Drawing Sheets

(51) Int. Cl.
*H04L 29/06* (2006.01)
*G06Q 20/40* (2012.01)
*G06K 9/00* (2006.01)
*G06Q 50/30* (2012.01)
*G07F 19/00* (2006.01)

(52) U.S. Cl.
CPC ....... *G06Q 20/40145* (2013.01); *G06Q 50/30* (2013.01); *H04L 9/3231* (2013.01); *H04L 63/107* (2013.01); *G06K 2009/00932* (2013.01); *G06K 2009/00939* (2013.01); *G07F 19/20* (2013.01)

(56) References Cited

U.S. PATENT DOCUMENTS

| | | | | |
|---|---|---|---|---|
| 7,502,761 | B2* | 3/2009 | Siegal | G06F 21/32 705/67 |
| 7,634,118 | B2* | 12/2009 | Matsuda | G06K 9/00885 340/5.1 |
| 9,306,749 | B2 | 4/2016 | Naccache | |
| 2003/0236120 | A1* | 12/2003 | Reece | A63F 13/12 463/42 |
| 2004/0172403 | A1* | 9/2004 | Steele | G07C 9/00 |
| 2004/0236701 | A1* | 11/2004 | Beenau | G06F 17/30725 705/64 |
| 2004/0258281 | A1* | 12/2004 | Delgrosso | G06K 9/00973 382/115 |
| 2006/0107063 | A1* | 5/2006 | Fiske | G06F 21/32 713/184 |
| 2007/0194882 | A1* | 8/2007 | Yokota | G06F 21/34 340/5.61 |
| 2008/0201214 | A1* | 8/2008 | Aaron | G06Q 30/02 705/14.47 |
| 2009/0064283 | A1* | 3/2009 | Chen | H04L 63/083 726/4 |
| 2011/0051658 | A1* | 3/2011 | Jin | G01S 19/48 370/328 |
| 2012/0191491 | A1* | 7/2012 | Choi | G06Q 10/02 705/5 |
| 2013/0036458 | A1* | 2/2013 | Liberman | H04L 9/3231 726/6 |
| 2013/0040406 | A1* | 2/2013 | Rostaing | B01L 3/502715 436/501 |
| 2013/0040606 | A1* | 2/2013 | Naccache | H04L 63/0492 455/411 |
| 2013/0176108 | A1* | 7/2013 | Madhani | G06F 21/32 340/5.82 |
| 2014/0196118 | A1* | 7/2014 | Weiss | H04L 63/0846 726/4 |

FOREIGN PATENT DOCUMENTS

| | | |
|---|---|---|
| WO | 2011/101407 A1 | 8/2011 |
| WO | 2014/097339 A2 | 6/2014 |

OTHER PUBLICATIONS

Kuseler, T. et al., "Using Geographical Location as an Authentication Factor to Enhance mCommerce Applications on Smartphones", International Journal of Computer Science and Security, 277-287 (2012).

* cited by examiner

METHOD FOR BIOMETRIC RECOGNITION OF A USER AMONGST A PLURALITY OF REGISTERED USERS TO A SERVICE, EMPLOYING USER LOCALIZATION INFORMATION

This application is a National Stage Application of PCT/IT2013/000345, filed 11 Dec. 2013, and which application is incorporated herein by reference. To the extent appropriate, a claim of priority is made to the above disclosed application.

TECHNOLOGICAL BACKGROUND OF THE INVENTION

Field of Application

The present invention relates to the field of the methods, based on acquisition and electronic processing of biometric data, for the recognition of users of services, the fruition of which requires a registration and an authorization. Particularly, the invention relates to a method of registering and recognizing a user among a plurality of users registered to a service, having characteristics of remarkable rapidity.

The invention also relates to a recognition system which carries out the above method, as well as service delivery systems comprising such a recognition system.

Description of the Prior Art

In the context of the offering of services the fruition of which requires a recognition and an authorization, the need and the convenience of using recognition and/or identity verification and/or authorization methods based on acquisition and electronic processing of biometric data are more and more felt.

Such a need is felt, for example, in the field of services related to commercial payments, for example, POS (Point Of Sale) type services, or services for the automatic withdrawal of money from bank accounts, such as, for example, cash dispenser/ATM (Automated Teller Machine) type services.

In the known POS and/or ATM systems, a card holder (holder of a credit card or debit card) accesses a service through two steps, the first of which involves the use of the card itself, the second of which is a confirmation of the card holder's identity, by typing a numeric/alphanumeric identification code, for example, a PIN or password. Then, an "identity verification" or "authentication" function is carried out, enabling the use of the card. In this framework, it is possible to envisage replacing the identification code with a biometric datum of the user.

Recently, several further services are emerging, which could benefit from the fact of allowing an access based on an automatic user recognition, on the basis of a processing of biometric data: for example, a service of quick access to a controlled-access public or private location, such as a city public transportation station with entering turnstiles (typically, a subway station). Herein below, such services will be referred to, sometimes, in short, as "new services with validated access".

On the other hand, a number of solutions for a verification of the user's identity based on the acquisition and processing of biometric data is known, derivable particularly from the field of the identity verification for security purposes (for example, to authorize or not entrance to restricted access areas, or to confidential data in an IT system).

The known solutions referred to are varied, both with respect to the biometric datum that is used (for example, fingerprint, or eye iris, or electrocardiographic or breath frequencies/patterns, or voice, or typing frequency/pressure on a keyboard) and with respect to the algorithms that are used for the comparison and recognition (usually, analytic "pattern-matching" algorithms).

However, the application of such known solutions to the above-mentioned application contexts is very troublesome.

In fact, for the above-mentioned application contexts, it is important to have sufficiently quick, convenient and simple acquisition procedures so as they are "attractive" for the user. This requirement already excludes most of the known solutions referred to.

A further problem, even more disadvantageous with respect to the felt needs in the mentioned contexts, is connected with the fact that the above-mentioned known solutions relate at most to an "identity verification" or "authentication" function, in the meaning explained above, while do not meet the need to "recognize" the user. In fact, for a "recognition service", the user must be identified without first having to introduce a presentation of him/herself, e.g., by inserting an identification card, or a credit or cash card.

Now, an "identity verification" service involves a mere "one-to-one" comparison between the acquired biometric data of the user and pre-registered biometric data of the same user.

On the contrary, a recognition service involves a "one-to-many" comparison between biometric data acquired from the user and and a plurality of previously registered biometric data, belonging to all the users registered for a given service. Such a plurality may be very numerous: in the field of the POS/ATM services, the number of registered users (for example, at a bank) is typically of hundreds of thousands or millions individuals. The same applies, for example, for a future assisted access service to the subway stations of a city.

Such quantitative data indicate what a difference is between the requirements to be met by a biometric method for an "identity verification" compared to a biometric method for a recognition, and allow understanding the reason why the developed solutions for the first field are completely unfeasible in the second one.

For these reasons, even when it might be possible to try applying known biometric authentication systems in the field of a "one-to-many" recognition service (in the meaning illustrated above), such solutions cannot be applied (actually, their application is not even conceivable) in the context of services requiring the recognition of a user among thousands, or hundreds of thousands, or even millions users, such as those contemplated by the present invention.

The main emerging problem relates to the duration of the recognition process, which requires a huge number of comparisons, rather than just one, before obtaining a result, which makes the idea of simply iterating many times in sequence the application of known identity verification biometric methods (such as those mentioned above) unfeasible as a recognition method.

In view of this problem, no feasible solutions can be found, not even resorting to solutions that are known in other fields, for example those based on the acquisition of fingerprints of a subject to be recognized and on scanning of a database of fingerprints to find a match. Such solutions, which are used, for example, in the legal investigation field, involve a recognition process duration which is longer, by several orders of magnitude, compared to the recognition process duration required in the application fields taken into account herein, which is acceptable if it lasts, at most, a few seconds.

In order to obviate the above-mentioned problems, possible improvements relating to the rapidity of the single comparison are useful, but not decisive. In fact, it has to be taken into account that the recognition methods, due to their own nature, must have a very high reliability degree as regards the recognition precision. Particularly, since the biometric data are identification codes that may be defined as "non-exact", in which there cannot be an absolute, deterministic identity between the registered datum and the datum acquired upon the recognition step, the fact of obtaining, from such non-exact identification codes, recognition results having a reliability comparable to those that can be obtained from exact identification codes (such as passwords and PINs) is a technical objective that cannot be achieved by the above-mentioned prior art. Such an objective requires that each comparison between the acquired datum and each of the registered data is performed very accurately, by sophisticated algorithms, which implies that the reduction of processing time for a single comparison cannot be pushed beyond certain limits.

The reliability requirements are apparent, and very strict, in the applications of the POS/ATM type, but they are high also in the applications of other types, relating for example to the "new services with validated access", mentioned above.

In brief, a biometric recognition method suitable to meet the needs of the application contexts considered in this invention must have a number of characteristics: simplicity and rapidity of acquisition of the biometric datum; processing speeds such as to allow a very fast recognition; high precision and reliability of the recognition.

No one of the solutions of the prior art, mentioned above, is capable of meeting at the same time all the needs mentioned above, and not even to offer a performance compromise approaching the required one.

Particularly, no one of the solutions of the prior art, mentioned above, can be applied in an efficient manner to the "new services with validated access", such as those set forth above.

SUMMARY OF THE INVENTION

Therefore, the object of the present invention is to devise and provide a method of registration and quick recognition of a user, which is improved so as to meet the above-mentioned needs, and capable of obviating the drawbacks described herein above with reference to the prior art.

It is also an object of the present invention to devise and provide a service delivery method, employing the above-mentioned recognition method, which is particularly efficient.

Moreover, the achievement of the object indicated above allows achieving the further objects of devising and providing a system of quick recognition of a user, which can be used in systems for accessing services, which systems are, in turn, improved so as to meet the above-mentioned needs, overcoming the above-mentioned drawbacks related to the prior art.

BRIEF DESCRIPTION OF THE DRAWINGS

Further characteristics and advantages of the registration and recognition method, of the service delivery method, of the system for the recognition of a user of a service, and of service delivery systems with validated access, according to the invention, will be apparent from the description set forth below of preferred implementation examples, given by way of illustrative, non-limiting example, with reference to the appended figures, in which.

DETAILED DESCRIPTION OF THE PREFERRED EMBODIMENTS

Figure 1:
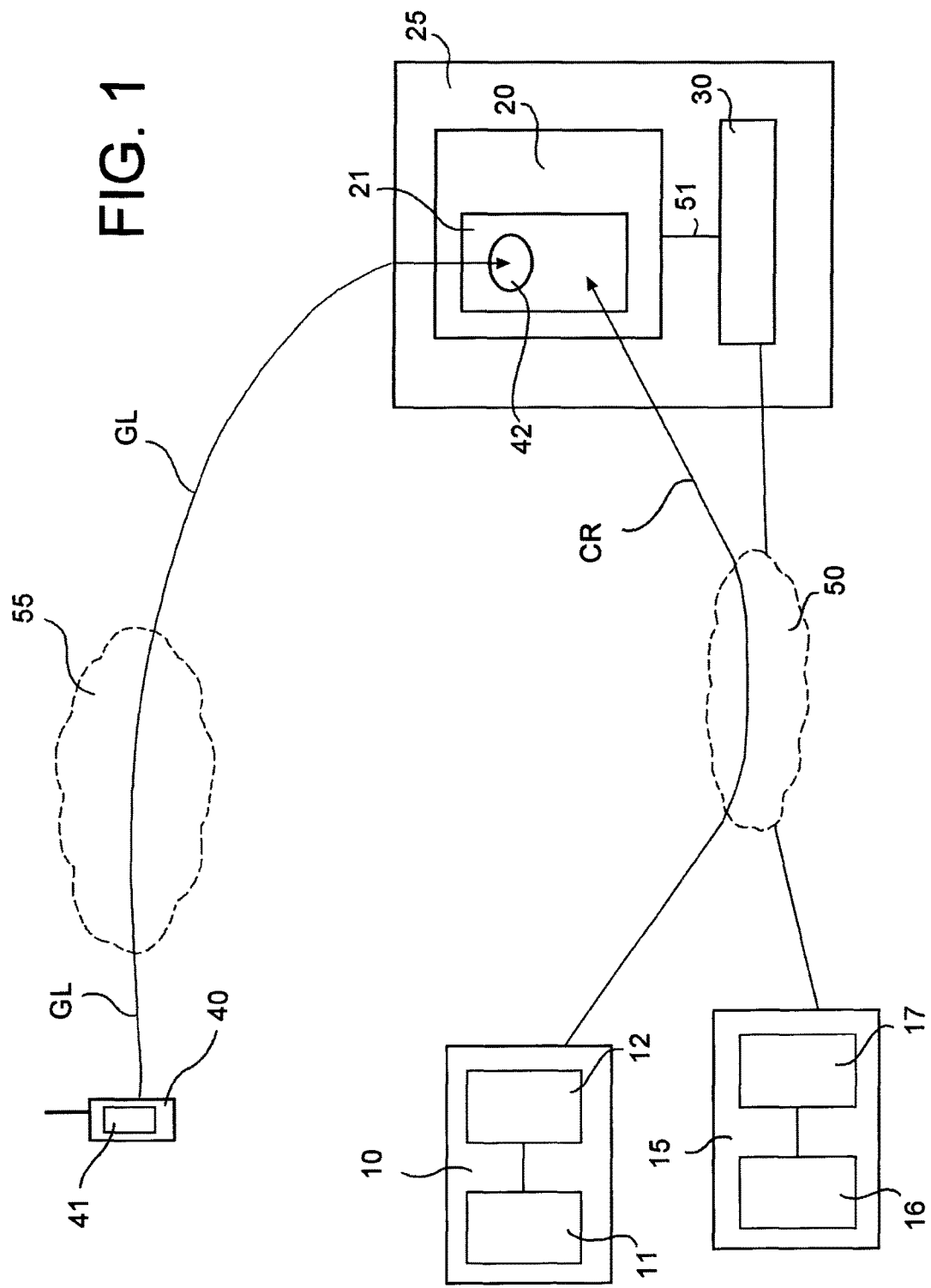
FIG. 1 illustrates a simplified functional scheme of a system for the recognition of a user according to an embodiment of the present invention.

A method of registration and quick recognition of a user of a service, through identification codes derivable from biometric data, by means of at least one recognition terminal, having a respective known localization, will be now described in more detail.

First of all, such method provides for the step of registering a user, through a respective registration event.

Each registration event comprises the steps of acquiring from the user to be registered at least one biometric datum; then, encoding, by means of a coding procedure, the at least one acquired biometric datum into a respective registration identification code of the user to be registered; then, associating such registration identification code to the user to be registered; finally, registering the user as a registered user, and registering the associated registration identification code as the registration identification code of the registered user.

The method also comprises the step of preparing and associating to each of the one or more recognition terminals a respective comparison set, comprising a plurality of comparison identification codes. Each comparison identification code corresponds to a registration identification code of a respective user registered in a previous registration event. Such preparing and associating step comprises the operation of selecting the plurality of comparison identification codes, among the registered identification codes, for each of the recognition terminals, based on a comparison between localization information of the registered user and the known localization of the recognition terminal.

The method further comprises the step of recognizing a registered user, among a plurality of registered users, by one of the recognition terminals, through a respective recognition event. Each recognition event comprises the step of acquiring from the user to be recognized the same at least one biometric datum acquired in the registration step; then, the step of encoding, by means of the same coding procedure already mentioned, the at least one acquired biometric datum into a respective recognition identification code of the user to be recognized.

Each recognition event further provides for comparing the recognition identification code with each of the comparison identification codes; then, estimating, for each of such comparisons, a respective matching level; finally, recognizing or non-recognizing (i.e., refusing recognition) the user to be recognized based on the estimated matching levels.

By the term "service" is generally meant a service the use of which requires a registration. As already noticed, the preferred application field of the method described above is the recognition of a user among a plurality, aimed to deliver a POS/ATM service, or a service of access to a city public transportation station, or, more generally, any service with a validated/controlled access providing for a plurality of recognition terminals distributed in the territory.

Typically—for a given service—the user registration events are many, one for each user, and occur upon the user registration. Therefore, they give rise to a plurality of registered identification codes, one for each registered user. Such registered identification codes are stored, and form the base on which the search aimed to the recognition is performed, during a recognition event.

The potential base of users of the above-mentioned services is numerically significant, already now, or it is foreseen it will become significant in a near future, up to orders of magnitude of millions of individuals. Therefore, the number of registered identification codes can be of the same potential order of magnitude, and also the size of the set of registered identification codes among which a scanning is to be performed to get the recognition; consequently, for each recognition event, the number of necessary comparisons between recognition identification code (i.e., the one acquired for the recognition) and registered identification registration codes may be very high.

By recognition event is meant the event occurring when the user, who has already registered for the use of the service, may want to access the service, for which he/she has to be recognized/identified in advance.

In view of what has been stated above, the method must have properties of particular rapidity and precision, to be able to meet the requirements imposed by the above-mentioned applications. Such properties are made possible by the characteristics of the method, illustrated above.

A particular remark can be drawn from the fact that the registered identification codes do not coincide with the acquired biometric data, but they bi-uniquely depend on them, through the coding procedure. It is important to note that the method of the invention is completely compatible with the fact that each data handling procedure, within the context of the registration and recognition, follows criteria per se known, and is strictly compliant with the requirements imposed by laws in force and by the opinions of the in-charge authorities on the matter of security and safeguarding of privacy.

Herein below, two preferred embodiments of the method will be described, each being subsequently articulated in different implementation variants.

The first embodiment (corresponding to the system illustrated in FIG. 1) provides that the user localization is determined based on geolocation (i.e., geolocalization) information provided, for example, by user terminals.

The second embodiment (corresponding to the system illustrated in FIG. 2) provides that the user localization is determined based on positioning information provided by a telecommunication network to which the user can connect.

In the first embodiment, each of the recognition terminals 10 is connected to a management center 25, in which the localization of each of them is stored. Therefore, the management center knows the localizations of the recognition terminals 10, typically spread in the territory, at service providing centers. According to an implementation variant, the recognition terminals 10 can be configured to send localization information to the management center 25, based on a geolocation device associated thereto.

Furthermore, in such a case, the step of registering a user comprises the provision of geolocation means 41, associable to the registered user, configured to provide geolocation information GL of the registered user. Such information may be sent "real-time" (relatively to the durations of the processes considered herein); therefore, such information can be dynamically updated.

Moreover, the step of selecting the plurality of identification codes of the comparison set, associated to each of the recognition terminals, comprises the steps of receiving and processing, by the management center 25, the geolocation information GL of geolocalizable registered users, to determine the localization of each geolocalizable registered user; then, comparing, by the management center 25, each of the localizations of the geolocalizable registered users and the known localization of the particular recognition terminal 10 for which the comparison set is being defined; finally, selecting the plurality of comparison identification codes, among all the registered identification codes, based on the above-mentioned comparison.

It shall be noticed that by a "geolocalizable user" is meant a user provided with geolocation means 41, and who keeps such geolocation means 41 active, so that the corresponding geolocation GL signals can reach the management center 25. On the contrary, a non-geolocalizable user is a user, among the registered ones, who decides, according to his/her choice, which is of course to be guaranteed, not to send geolocalization signals, for example, by turning his/her mobile terminal 40 off.

With reference to the comparison sets, it shall be further noticed that each recognition terminal 10 is associated to a respective comparison set, and that each of these comparison sets can be dynamically updated, by the management center 25, based on the geolocation information GL of the users, evolving in real time.

In an implementation example, the above-mentioned step of providing geolocation means 41, associable to the registered user, comprises providing a "client" application program 41 suitable to be loaded on a mobile user terminal 40 having geolocation functions; such "client" application program 41 is configured to acquire geolocation information GL and to send it to the management center 25. Furthermore, in this case, the method comprises providing a "server" application program 42, in the management center 25, configured to receive geolocation information GL from the mobile user terminal 40, to recognize the respective user of the mobile terminal, to check whether the user is a registered user, and, if so, to associate the received geolocation information GL to the registration identification code of the user.

In such a case, the registered user selects whether to be a geolocalizable registered user or not by acting on the mobile terminal 40 (for example, by turning it on or off) or by acting on an enabling/disabling control provided by the "client" application program 41.

In the second embodiment, already mentioned above, each of the at least one recognition terminal 10 is connected to a management center 25, in which the localization of each recognition terminal is stored. Also in this case, the management center 25 knows the localization of the recognition terminals 10, typically spread in the territory, at service providing centers. According to an implementation variant, the recognition terminals 10 can be configured to send localization information to the management center 25, based on a geolocation device associated thereto.

Furthermore, in such a case, the step of registering a user comprises the provision of connection means 43, associable to the registered user, configured to allow a connection of the registered user to a telecommunication network 60 comprising a network control center (63), capable of detecting positioning information P of connected registered users, and operatively connected to the management center 25.

Moreover, the step of selecting the plurality of identification codes comprises the steps of detecting, by the network control center 63, for each connected registered user, a respective positioning information P; the network control center 63 then communicates to the management center 25 such a positioning information P for each registered user. The management center 25 processes the received positioning information P, to determine in real time the localization of each connected registered user; then, it compares the localizations of the connected registered users and the known localization of the recognition terminal 10; finally, it selects the plurality of comparison identification codes, among all the registered identification codes, based on the results of such comparison.

In an implementation example, the telecommunication network 60 is a wireless access network provided with a plurality of access points 61. In such a case, the above-mentioned step of detecting positioning information P comprises identifying the access point 61 to which a user is connected, and determining the positioning information P of the user based on the access point 61 to which the user is connected.

According to an implementation example, the access point 61 is a wireless access point (or "access point") 61 or an access router 62.

The telecommunication network 60 may be a mobile network (for example, 3G/UMTS) or, preferably, a wireless network of the WiFi type, or, according to another example, of the Bluetooth or LBTE (Bluetooth with very low energy consumption) type.

It shall be noticed that the second embodiment, described just above, can be advantageously applied for example in those scenarios (increasingly emerging) wherein an entity delivering a service with validated access, having multiple delivery points in a territory, makes use on one hand of the recognition method according to the present invention, and, on the other hand, offers its clients a wireless network access service, for example by means of a private WiFi network open to registered clients.

In such a case, the WiFi network, at some network level, has an information about the access point to which a given user is connected, and therefore an information about the user position. The WiFi network can communicate to the management center of the recognition method such positioning information, and then allows such management center triggering the recognition procedure, which procedure can therefore use the received positioning information to determine the localization of the user.

Herein below, reference will be made to another aspect of the recognition method of the present invention, i.e., to the manner in which the "localization" of the user is expressed and processed.

Two preferred implementation options will be described (without excluding other options, also potentially encompassed in the invention): a localization in terms of geographic coordinates, and a localization in terms of a presence of the user within a given "access area". Both options may be comprised in each of the two embodiments of the method illustrated above, even if the use of the geographic coordinates is contemplated preferably in the first embodiment, and, on the other hand, the use of the "access area" is contemplated preferably in the second embodiment.

Therefore, according to an implementation option, the localization of each recognition terminal 10, known to the management center 25, is defined in terms of geographic coordinates of the recognition terminal 10. In this case, the step of comparing the positions of the users and the position of the recognition terminal comprises the steps of determining the position of each geolocalizable user, by the management center 25, based on the respective geolocation information available, in terms of geographic coordinates of the geolocalizable user; then, calculating a distance between each geolocalizable user and each of the recognition terminals 10, based on the geographic coordinates of the geolocalizable user and the geographic coordinates of the recognition terminal.

It shall be noticed that by geographic coordinates are meant for example the latitude and longitude coordinates, which can be determined, for example, by the coordinates provided by a satellite-based geolocation system, per se known, such as GPS or Galileo.

It shall be further noticed that, in the above-mentioned implementation example, the method provides for calculating a kind of matrix of the "user to recognition terminal" distances, so as to potentially know, at each moment, the distance from any users to any of the recognition terminals of the network controlled by the management center.

Possible alternatives to calculate the "user to recognition terminal" distances will be illustrated herein below, in the more detailed description of the system implementing the method of the invention.

Based on the knowledge of the "user to recognition terminal" distances, the step of selecting the comparison identification codes, associated to a recognition terminal, comprises for example selecting the identification registration codes of the geolocalizable registered users for which the distance from the recognition terminal is less than a pre-settable threshold distance.

In other terms, the comparison set of a given recognition terminal, in a given moment, comprises all the registered identification codes of those users who, in view of the geolocation information available in real time, are present within a given radius from the recognition terminal.

This implies that, if the user near to the recognition terminal actually reaches the recognition terminal and performs a recognition event, the recognition identification code acquired by the recognition terminal is immediately compared only with the registered identification codes of the set of registered users who are present in the proximity of that recognition terminal. Such set, on one hand, certainly contains the registered identification code of the user at issue; on the other hand, it includes a sub-set, which is most likely very small compared to the set of all the registered users. Therefore, the number of comparisons that are necessary to achieve the recognition may be drastically reduced, compared to a method that does not provide for the geolocation of the users; hence, a drastically reduced recognition time and an improved recognition reliability.

From what has been stated above, the advantages to use localization information, by relating it to information on the localization of the recognition terminals are apparent, in the field of a recognition method based on biometric data.

Such advantages may be easily identified also in several other possible strategies of correlation between user localization information and information on the position of the recognition terminals, which are also encompassed by the invention.

For example, in a particular alternative implementation example, providing for the presence of a plurality of recognition devices, the step of selecting the comparison identification codes, associated to a particular recognition terminal 10, comprises the step of assigning the registration identification code of each of the geolocalizable registered users to the comparison set of the recognition terminal 10 which is located at the shortest distance from the geolocalizable registered user.

In other terms, each geolocalizable user has his/her own registered identification code included in the comparison set of the recognition terminal nearest to him/her, towards which he/she is most likely going. In such a manner, a kind of "competence area" of each recognition terminal is generated.

It shall be apparent that, in alternative examples also encompassed in the invention, it is possible that the identification code of a registered user is included in several comparison sets, corresponding to the two or three or more nearest recognition terminals (for example, in a city, where the density of the recognition terminals is higher). This corresponds to the fact that the different comparison sets may have non-null intersections, and that the "competence areas" of the different recognition terminals may overlap in multiple areas, according to the most varied management criteria that can be applied by the service provider.

According to the other above-mentioned preferred implementation option, relating to localization, the localization is defined in terms of an "access area", in which the user is present, associated to an access point 61 of a telecommunication network 60 the user is connected to. In this case, the step of comparing the positions of the users and the position of the recognition terminal comprises the steps of determining the localization of a user, in terms of presence of the user within said "access area".

In such a case, therefore, the management center 25 carries out a kind of "mapping" and subdivision of the territory into "access areas", or "competence areas" pertaining to different respective access points of the network 60 (for example, a WiFi network), to which a registered user may access, and then defines the localization of the user in terms of such mapping operation.

If the method is implemented by a plurality of recognition devices 10, even in this case the step of selecting the comparison identification codes, associated to a given recognition terminal 10, may comprise the assignment of the registration identification code of each of the registered users to the comparison set of the recognition terminal 10 which is located at the shortest distance from the access area in which the user presence is detected.

In those applications in which at least one of the recognition terminals 10 is associated to a respective access point 61, the step of selecting the comparison identification codes, associated to a recognition terminal (10), may comprise the assignment of the registration identification code of each of the registered users to the comparison set of the recognition terminal 10 associated to the access point 61 to which the user is connected.

Referring now to the order with which the comparisons of the recognition identification code with the comparison identification codes are performed, both the embodiments of the method may provide that such order depends on the localization information of the registered user corresponding to each of the selected plurality of comparison identification codes.

According to an implementation example, the comparison is performed by following the iterative rule of performing with priority the comparison between the recognition identification code and the identification comparison code, not yet compared, corresponding to the geolocalizable registered or connected user who is nearest to the recognition terminal. In other terms, not only a "comparison set" of the recognition terminal (subset of the set of all the registered users) is defined, but, within this subset, the comparisons are progressively performed with the codes of those users who are nearest to the recognition terminal. This may even lead to select immediately the "correct" comparison code (the one of a user very near to the recognition terminal, to which he/she is actually going), in the case that no other registered users are present in the immediate proximity, which in turn may even lead to a recognition at the first attempt.

In accordance with a further implementation example, the step of providing a comparison set associated to a recognition terminal 10 comprises the steps of defining the comparison set starting from the overall set of all the identification registration codes of the plurality of already registered users; then, classifying each registered registration identification code, based on one or more classification variables, comprising a classification variable depending on the comparison between localization information of the registered user and the known localization of the recognition terminal; finally, grouping the registered registration identification codes into sets of comparison identification codes, based on such classification.

In a particular example, the above-mentioned grouping step further comprises indexing the registered registration identification codes based on such classification variables.

If the registered identification codes are stored in a database, the database may be scanned with a scanning order based on the grouping, and comparisons are carried out according to such scanning order. For example, comparisons are performed only, or with priority, on the set of identification codes prepared according to the above-mentioned criteria.

Of course, when a user has not been recognized at the end of all the comparisons with each of the selected plurality of comparison identification codes, the method may optionally comprise the further steps of comparing the recognition identification code with each of the registration identification codes not comprised in the selected plurality of comparison identification codes; and then proceeding to estimate, for each comparison, a respective matching level, and recognizing or not recognizing the user to be recognized based on the estimated matching levels.

It has already been noticed that the recognition functions offered by the present method go well beyond the functions of a mere identity verification, and give rise to more challenging requirements. In fact, they provide not a comparison between a single acquired identification code and a single registered identification code, but a comparison of the acquired identification code with each of a plurality of registered identification codes (for example, stored in a database).

Therefore, an essential aspect to make the performance of the method suitable for the considered applications is to quicken the plurality of comparisons to be performed, the number of which may be of the same order of magnitude of the size of the registered client database, i.e., up to hundreds of thousand or even millions users.

To this aim, as noticed above, the method provides for optimized modes of "surfing" the database, based on an "intelligent" database parsing, depending on priority criteria indicating which parts of the database have to be scanned first, because therein it is expected to find, with a higher probability, the corresponding registered identification code that may lead to the recognition. Such priority criteria may comprise a "clusterization" of the database, providing for different and optimized clusters for each of the recognition terminals, wherein the "clusterization" is performed based on a knowledge of the positions of the registered users and of the localization of recognition terminals.

According to an implementation option, the at least one biometric datum, already cited several times above, is a biometric datum related to a configuration of blood vessels.

For example, such biometric datum may be an image of a hand of the user to be registered or recognized. More specifically, such image may be an image of the palm of the hand.

In such a case, per se known methods may be used for the acquisition of the biometric datum. For example, the hand image may be acquired by means of an infrared sensor, configured to detect the presence of oxygen in zones corresponding to the passage of blood vessels in the hand, so as to obtain a corresponding representation of a geometry of the blood vessels of the hand.

In this regard, it is further noticed that the geometry of the hand blood vessels (hence, of the venous pattern of the palm) is an individual characterizing aspect, usually constant upon time, and it is therefore suitable to be a characterizing biometric datum, such as to allow a recognition and identification.

In further implementation examples, also encompassed in the invention, the biometric data may be referred to other body parts.

In other embodiments, also encompassed in the invention, any of one or more biometric data even not related to a configuration of blood vessels, may be used, such as fingerprints, eye iris, face recognition, or other ones.

Referring back to the preferred example, which comprises the acquisition of the image of the hand venous geometry, it shall be noticed that the digital image of the hand is obtained, as an output of an acquisition device, in the form of a multi-dimensional vector, i.e., a matrix, of bytes, each of which being indexed to indicate a spatial pixel, and containing for example a value relative to the shade of gray of the pixel.

In accordance with an embodiment, such matrix of data is processed by a suitable coding procedure (i.e., encoding method), so as to obtain an identification code which is a non-exact identification code.

The notion of non-exact code (such as a biometric datum) compared to an exact code (such as a password) has been already illustrated above. Particularly, a non-exact code is an identification code allowing a recognition procedure to work even in the absence of a perfect identity among the biometric data of the same user which are acquired during the registration phase and the recognition phase.

Different coding examples, per se known, may be used in the present method.

For example, the step of coding the acquired biometric datum, at a registration or recognition event, may comprise a processing of the acquired biometric datum so as to obtain, as a respective identification code, a respective representation according to a given mathematical grammatical scheme, i.e. a "stylized" image.

In this case, at each event of image acquisition, both during the registration, and at each recognition event, the acquired image is "filtered", i.e., processed, so as to get a minimum scheme (pattern) of traits that are essential for the recognition: this aspect is part of the coding procedure. An aspect of such filtering is to rectify the identified main blood vessels, thus determining a stylized image of few straight segments and a few crossings, as a kind of ideogram, which is the individual aspect of the venous pattern. Such stylized image may be stored as a registration or recognition identification code, and advantageously requires a limited memory space and allows a simplified comparison.

Of course, the same type of processing is performed both on the acquired image at the registration step and on the acquired image at the authentication step, to ensure a meaningful comparison.

It shall be noticed that the image processing operations, mentioned above, consist of processing operations performed on the matrix representing the acquired image: a transformation of the matrix is performed, to obtain a vector of numbers representing the registration or recognition identification code. Among the algorithms that can be used for the above-mentioned image processing the Scale-Invariant Feature Transform (SIFT) algorithm, per se known, may be mentioned, by way of non-limiting example Considering now the already mentioned comparisons necessary to achieve the recognition, it shall be noticed that, in accordance with an embodiment of the method, each comparison between recognition the identification code and one of the comparison identification codes comprises a processing performed by applying at least one trained algorithm (that can be equivalently defined as "learning algorithm").

According to a particular example, the at least one trained algorithm, used for each comparison, comprises a trained meta-algorithm M-A, configured to estimate the matching level of each comparison and determining or not the recognition of the user to be recognized, based on results obtained from two or more different matching level calculation algorithms (in the example of two calculation algorithms, they will be referred to as A1 and A2).

Therefore, in such a case, the overall algorithm, employed for the processing of the method according to the invention, comprises a trained meta-algorithm and two or more matching level calculation algorithms.

The trained meta-algorithm M-A can be a parametric meta-algorithm, suitable to be represented by means of a parametric formula based on the results of a set of matching level calculation algorithms (A1, A2), wherein each of the parameters of the parametric formula is defined based on a level of reliability of the respective calculation algorithm.

Possibly, the trained meta-algorithm M-A can be an analytic meta-algorithm, suitable to be represented as a finite linear combination, with real coefficients, of a set of matching level calculation algorithms, wherein each of the coefficients is defined on the basis of a level of reliability of the respective calculation algorithm.

In this description, the term "meta-algorithm" is taken to mean an algorithm operating on the basis of other algorithms or, in other terms, an algorithm which performs "pooling" from a set of algorithms, components of the "pool".

In the present description, the term "trained meta-algorithm (or algorithm)" is used to mean that the method of functioning of the meta-algorithm (or algorithm) is updated on the basis of the produced results and of the nature of the incoming input, at least in an initial learning (or training) phase.

As regards the matching level calculation algorithms (A1, A2), they may be trained or untrained calculation algorithms, in accordance with different examples comprised in the invention.

In turn, the calculation algorithms A1, A2 may comprise parametric calculation algorithms, or analytic calculation algorithms.

The processing performed in the phase of comparing identification codes, employing a trained meta-algorithm M-A, comprises for example the steps of calculating a first matching level between two identification codes to be compared, by means of a first matching level calculation algorithm (A1); then, calculating at least a second matching level between such two identification codes to be compared, by means of a second matching level calculation algorithm (A2); lastly, combining the first calculated matching level and the second calculated matching level, each weighted by a respective weight parameter, by the trained meta-algorithm M-A, to estimate the matching level of each comparison. Each of the weight parameters is defined based on a level of reliability of the respective matching level calculation algorithm.

Each single comparison action, between a recognition identification code, acquired upon a specific recognition event, and one of the registered identification registration codes, first provides for a "matching" evaluation, to quantify a "matching probability", i.e., the above-mentioned "matching level"; then, a comparison of the obtained matching level with a preset matching (i.e., recognition) threshold.

The number of the calculation algorithms that are employed may vary, in different implementation examples of the invention. The type of usable algorithms may also vary, and per se known algorithms can be selected in the most suitable manner and employed in the method of the invention.

Typically, both the trained meta-algorithm M-A and the matching level calculation algorithms A1, A2 belong to a set comprising the following algorithms or algorithm families: "Support Vector Machines", "Restricted Boltzmann Machines", pattern mining algorithms, Bayesian algorithms, Markov models, neural networks, boosting techniques, evolutive algorithms, algorithms using Locally Weighted Linear Regression, collaborative filtering algorithms, algorithms using space dimension reduction techniques.

The method according to the invention, described above, may be employed not only for the recognition, but also, possibly, to perform propaedeutic or preparatory functions relative to a service delivery.

To this aim, in a particular embodiment, the method comprises, after the step of recognizing or not recognizing the user, the further step of providing to a service delivery apparatus an indication of recognition or non-recognition of the user; furthermore, only if the user has been recognized as one of the registered users, the method comprises providing to the service delivery apparatus an indication of the identity of the recognized user.

According to preferred embodiments of the invention, the above-mentioned service delivery method relates to the delivering of a POS service or an ATM service.

In accordance with another preferred embodiment of the method, the method relates to providing an access service to a city public transportation station, for example a subway station having an access control implemented by means of turnstiles.

Again with reference to the FIGS. 1 and 2, a system 1 for the quick recognition of a user of a service, by means of identification codes derivable from biometric data, is now described.

Such a system 1 comprises at least one recognition terminal 10, storing means 30, and a recognition apparatus (server) 20.

Each of the recognition terminals 10 comprises biometric data acquisition means 11, configured to acquire at least one user biometric datum.

Each of the recognition terminals 10 further comprises recognition terminal processing means 12, operatively connected to the biometric data acquisition means 11, to receive the at least one acquired biometric datum, and configured to encode the at least one acquired biometric datum into a recognition identification code CR of the user, at a recognition event of the user.

The storing means 30 are configured to store a plurality of registered registration identification codes CR, associated to respective users registered by means of previous registration events.

The recognition apparatus 20 is operatively connected to each of the one or more recognition terminals 10, to receive the recognition identification code CR generated by the terminal, and it is further operatively connected to the storing means 30 to access the registered registration identification codes.

The recognition apparatus 20 comprises recognition processing means 21, configured to perform at least the following operations: preparing and associating to each of the recognition terminals a respective comparison set, comprising a plurality of comparison identification codes, each corresponding to a registered registration identification code; then, comparing the recognition identification code CR with each of the comparison identification codes of the comparison set of the recognition terminal 10 from which the recognition identification code CR comes; finally, estimating, for each of said comparisons, a respective matching level, and recognizing or refusing recognition of the user to be recognized, based on the estimated matching levels.

The recognition processing means 21 are configured to select the comparison identification codes, for each of the recognition terminals, based on a comparison between localization information of registered users and the known localization of the recognition terminal itself.

According to an implementation example, the recognition processing means 21 comprise one or more different calculation units.

It shall be further noticed that the recognition apparatus 20 and the storing means 30 may be comprised (according to an implementation example) in what has been previously referred to as the "management center 25".

In accordance with a first embodiment, schematically illustrated in FIG. 1, the system 1 further comprises geolocation means 41, associable to the registered user, configured to provide geolocation information GL of the registered user. Such information may be defined in short as "updated in real time", with respect to the durations of the involved processes. In such a case, the storing means 30 are further configured to store the localization of each of the at least one recognition terminal 10.

The recognition processing means 21 are further configured to receive and process the geolocation information GL of geolocalizable registered users, in order to determine (in real time, in the terms described above) the localization of each geolocalizable registered user; then, to compare each of the localizations of the geolocalizable registered users with the localization of the recognition terminal 10 from which the recognition identification code CR comes; finally, to select the plurality of 3o comparison identification codes, among all the registered identification codes, based on the above-mentioned comparison.

According to a particular implementation option, the geolocation means 41 comprise a "client" application program 41, suitable to be executed on a mobile user terminal 40 provided with geolocation functions and suitable to be connected to a mobile network 55. Such a mobile network (which is not per se a part of the system of the invention, and which is therefore indicated by a hatched line in FIG. 1) is, for example, a mobile network 3G/UMTS.

The "client" program 41 is configured to acquire geolocation information GL and to send it to the recognition apparatus 10.

The system 1, in this case, further comprises a "server" application program 42, suitable to be executed by the recognition processing means 21, configured to receive geolocation information GL from the mobile user terminal 41, to recognize the respective user of the mobile terminal, to check whether the user is a registered user, and, if so, to associate the received geolocation information to the user registration identification code.

In an implementation option, the mobile user terminal 40 comprises a satellite-navigation-based localization device, per se known (for example based on GPS, or, in the future, on Galileo). In such a case, the "client" application program 41 acquires geolocation information from such satellite-navigation-based localization device.

According to an alternative implementation option, the mobile user terminal 40, the "client" application program 41 (or another program interacting therewith, loaded on the mobile terminal 40) acquires localization/geolocation information based on triangulation techniques with the radio base stations of the mobile network.

According to another alternative implementation option, the "client" application program 41 is configured to acquire geolocation information from the mobile network 55 to which the mobile user terminal is connectable, for example, a mobile network 3G/UMTS. To this aim, per se known geolocation methods may be exploited, for example based on triangulations of signals coming from different radio base stations.

In accordance with a particular implementation example, the "client" application program 41 is configured to associate a user alphanumeric code to the geolocation information GL to be sent to the recognition apparatus. In such a case, the "server" application program 42 is configured to recognize the user based on such a user alphanumeric code.

According to another particular implementation example, the "client" application program 41 is provided with means for activating or deactivating the sending of geolocation information GL, so that the registered user may select, in each moment, to be or not a geolocalizable registered user.

Figure 2:
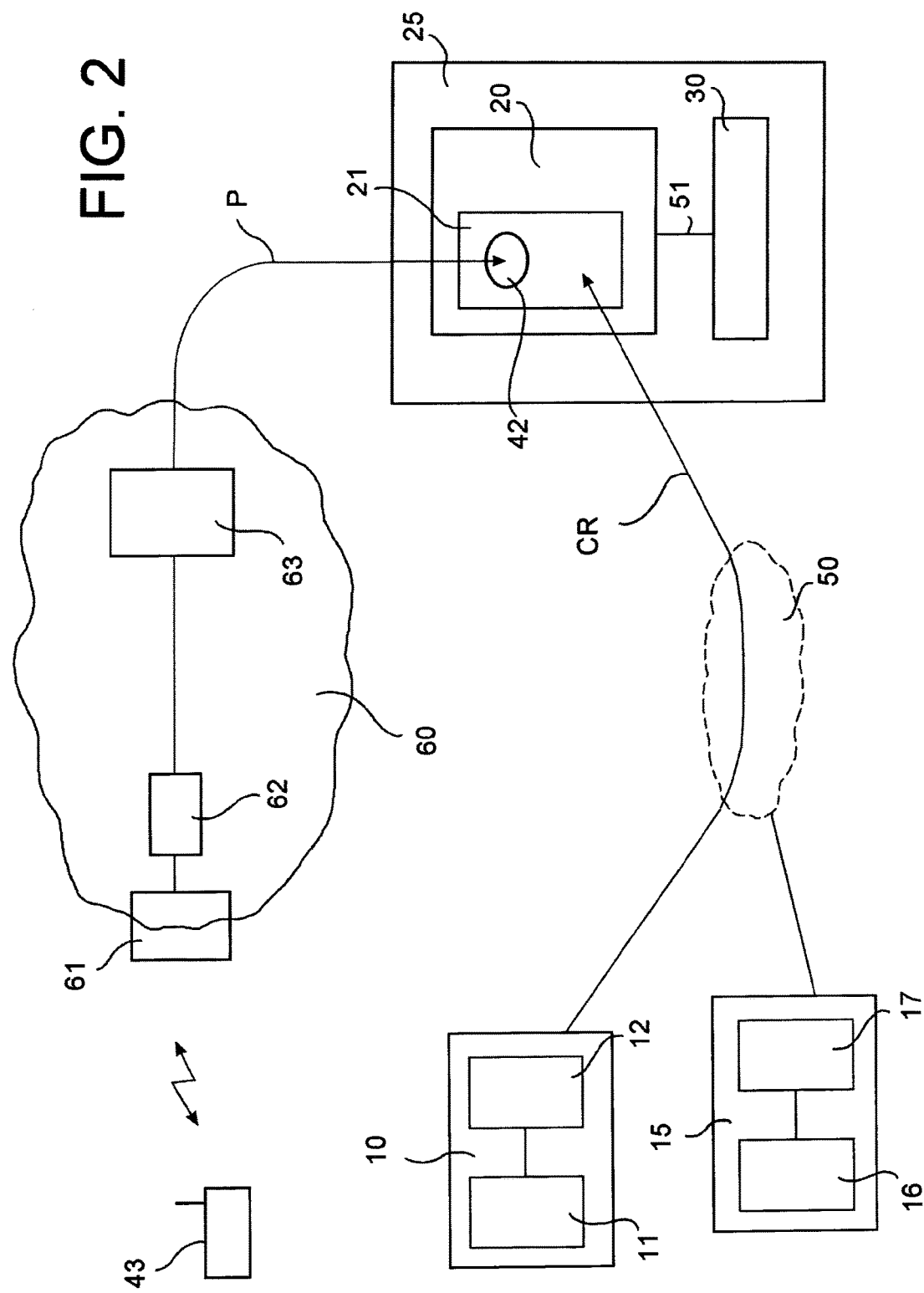
FIG. 2 illustrates a simplified functional scheme of a system for the recognition of a user according to a further embodiment of the present invention.

In accordance with a second embodiment, schematically illustrated in FIG. 2, the system 1 further comprises a telecommunication network 60 comprising a network control center 63, capable of detecting positioning information P of connected registered users, and operatively connected with the recognition apparatus 20, and also comprises connection means 43, associable to the registered user, configured to allow a connection of the registered user to the telecommunication network 60.

In such a case, the storing means 30 are further configured to store the localization of each recognition terminal 10.

Furthermore, the recognition processing means (21) are further configured to receive and process the positioning information P of connected registered users, to determine (in real time, in the terms described above) the localization of each connected registered user; then, to compare each of the localizations of the connected registered users with the localization of the recognition terminal 10 from which the recognition identification code (CR) comes; finally, to select the plurality of comparison identification codes, among all the registered identification codes, based on such comparison.

According to a particular implementation option, the telecommunication network 60 is a network with a wireless access 60 provided with a plurality of access points 61. The network control center 63 is further configured to identify the wireless access point 61 to which a user is connected; and to determine the positioning information P of such a user based on the wireless access point 61 to which the user is connected.

The telecommunication network 60 may be, for example, a WiFi network or a 3G/UMTS network.

The network control center 63 may be any network node provided with the "software intelligence" necessary to perform the above-mentioned functions. It may be a "high-level" control node or even a control node near to the access point (for example, an access router IP).

In accordance with a particular implementation example, the system 1 further comprises at least one registration terminal 15.

The registration terminal 15, in turn, comprises further biometric data acquisition means 16, configured to acquire at least one user biometric datum; and further registration terminal processing means 17, operatively connected to the further biometric data acquisition means 16, to receive the at least one acquired biometric datum. Such second processing means 17 are configured to encode the at least one acquired biometric datum into a user registration identification code, at a registration event of the user.

In this case, the storing means 30 are further operatively connected to the registration terminal 15, to receive the registration identification code generated thereby, upon the registration event.

According to an implementation option, the registration terminal 15 and the recognition terminal 10 substantially have the same structure and the same functions.

According to a further implementation option, the registration terminal 15, configured to perform registration events, and the recognition terminal 10, configured to perform recognition events, are comprised in a single acquisition and encoding device, comprising processing acquisition and encoding means configured to operate as recognition terminal processing means 12 and as registration terminal processing means 17.

In accordance with another implementation option of the recognition system 1, the recognition apparatus 20 is a server 20, located for example at a management center 25 of the entity delivering or managing the service, and remotely connected to the recognition terminal 10 or to the registration terminal 15 or to the acquisition and encoding device by a communication infrastructure 50.

With reference to the above-mentioned operative connections between the components of the system, it shall be further noticed that the operative connection between the recognition terminal 10 and the recognition server 20 can be implemented by any per se known telecommunications infrastructure 50 (preferably, a telecommunication network of the service provider entity, e.g., a VPN of a bank).

Similarly, the operative connection between the registration terminal 15 and the recognition server 20 can be implemented by the communication infrastructure 50 or the like.

It shall be noticed that the infrastructure 50 is indicated by a hatched line, in the FIGS. 1 and 2, since it is not per se a part of the invention (as stated, the indicated operative connections are sufficient, no matter how they are implemented, even by direct point-point links). Furthermore, such an infrastructure 50 may be completely separated from the telecommunication network 60 and from the mobile network 55, illustrated above; on the other hand, it is possible that such entities share some infrastructural portions, in a per se known manner.

The operative connection 51 between the recognition server 20 and the storing means 30 can be implemented by further communication infrastructure. Preferably, the storing means 30 are co-located with the recognition server 20 in the management center 25, and the communication infrastructure connecting them is a local network (LAN) 51 present in such a center.

In order to support the above connections, the components of the system (recognition terminal 10, registration terminal 15, recognition server 20, and storing means 30, if not comprised in the server 20) are provided with respective communication interfaces, per se known, with the telecommunication network(s).

According to a further particular implementation example, not illustrated in the figures, the recognition system further comprises a signaling device, operatively connected to the recognition apparatus to receive an indication of recognition or non-recognition, and configured to signal such indication of recognition or non-recognition.

In a particular implementation example, the signaling recognition device is comprised in the above-mentioned acquisition and encoding device.

According to an implementation example, the biometric data acquisition means 11 comprise acquisition means of an image in the infrared and near infrared spectrum band of the user's hand, comprising at least one infrared sensor device configured to detect the presence of oxygen in zones corresponding to the passage of blood vessels in the hand, so as to obtain a corresponding representation of a geometry of the blood vessels of the hand. The infrared sensor is capable of generating a digital representation of the acquired image, and the related geometry, and of providing in output such a digital representation to the first processing means 12, to be processed as already described above, with reference to the method of the invention.

The above-mentioned recognition terminal processing and registration means, and the recognition processing means are implemented by processors or information machines or computers, per se known.

The storing means 30 are implemented for example by computers or workstations provided with memories, per se known. In different embodiments of the system, they may comprise one or more storing supports of the registered identification codes. In the case of multiple storing supports, they may be centralized or distributed.

According to different implementation examples, the storing means are incorporated in the server 20, or co-located in the same information center in which the server 20 is located, or not co-located and remotely accessible.

In accordance with an implementation option, the storing means 30 comprise a registration database of the registered identification codes.

The recognition system 1 according to the present invention, in all the embodiments and implementation variants described above, is configured to carry out a registration and recognition method according to any of the embodiments of the method illustrated above.

Particularly, the above-mentioned registration terminal processing means 12, registration terminal processing means 17, and the recognition processing means 21 are configured to perform a registration and recognition method according to any of the embodiments of the method illustrated above.

Figure 3:
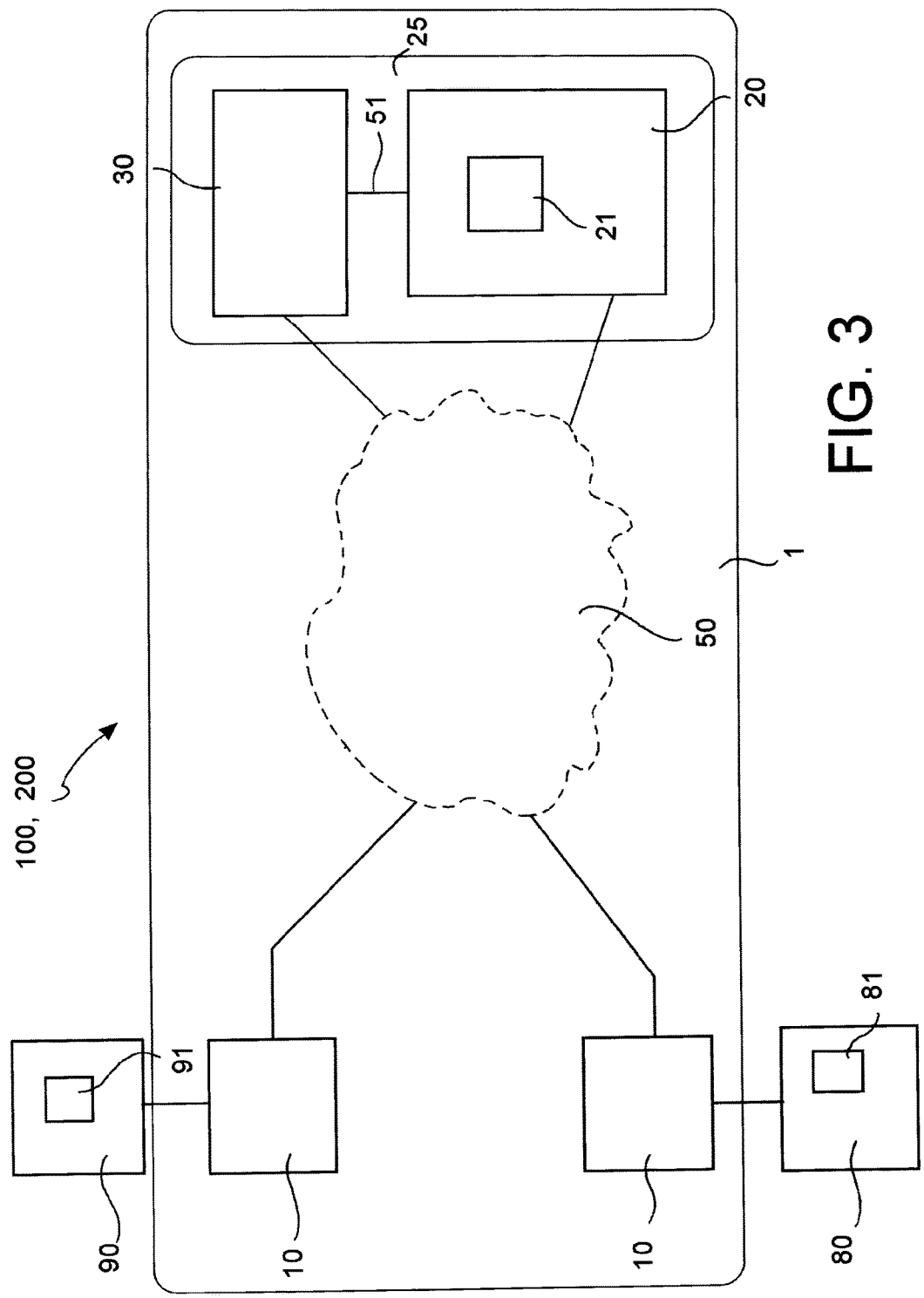
FIGS. 3 and 4 illustrate respective simplified functional schemes of systems for delivering services with validated access, encompassed in the invention, using the system of FIG. 1.

With reference to the FIG. 3, a POS (Point Of Sale) system is now described, which is encompassed in the invention, for delivering POS (Point Of Sale) services conditional to the recognition of a registered user.

The system POS 100 comprises a POS device 80, per se known, comprising POS processing means 81 configured to deliver a POS service, and further a system 1 for the quick recognition of a user according to the embodiments already described above.

In the recognition system comprised in the POS system, the recognition processing means 21 are further configured to send to the recognition terminal 10 an indication of recognition or non-recognition of the user.

The recognition terminal 10 is co-located with and operatively connected to the POS device 80 to transmit to the POS processing means 81 of the POS device 80 such an indication of recognition or non-recognition.

Furthermore, the POS processing means 81 are configured to deliver the service only if they have received the above-mentioned indication of recognition.

Referring again to FIG. 3, an ATM (Automatic Teller Machine) system is now described, encompassed in the invention, for delivering ATM (Automatic Teller Machine) services conditional to the recognition of a registered user. The term ATM is meant to indicate also the synonym term "cash dispenser".

The system ATM 200 comprises an ATM device 90, per se known, comprising ATM processing means 91 configured to deliver an ATM service, and furthermore a system 1 for the quick recognition of a user according to the embodiments already described above.

In the recognition system 1, comprised in the ATM system, the recognition processing means 21 are further configured to send to the recognition terminal 10 an indication of recognition or non-recognition of the user.

The recognition terminal 10 is co-located with and operatively connected to the ATM device 90 to transmit to the ATM processing means 91 of the ATM device 90 such a recognition or non-recognition indication.

Furthermore, the ATM processing means 91 are configured to deliver the service only if they have received the above-mentioned indication of recognition.

In FIG. 2, an example is illustrated, in which both a POS system 100 (comprising a POS device 80 located for example at a shop, client of a bank) and an ATM/cash dispenser system 200 (comprising an ATM device 90 located for example at an agency or a branch of the bank) are comprised, which are connected to a same recognition system (the one of the above-mentioned bank).

It shall be apparent that the invention also comprises the cases where the two systems (the POS system 100 and the ATM system 200) are mutually independent, and depend on two different recognition systems (each one according to the invention).

Figure 4:
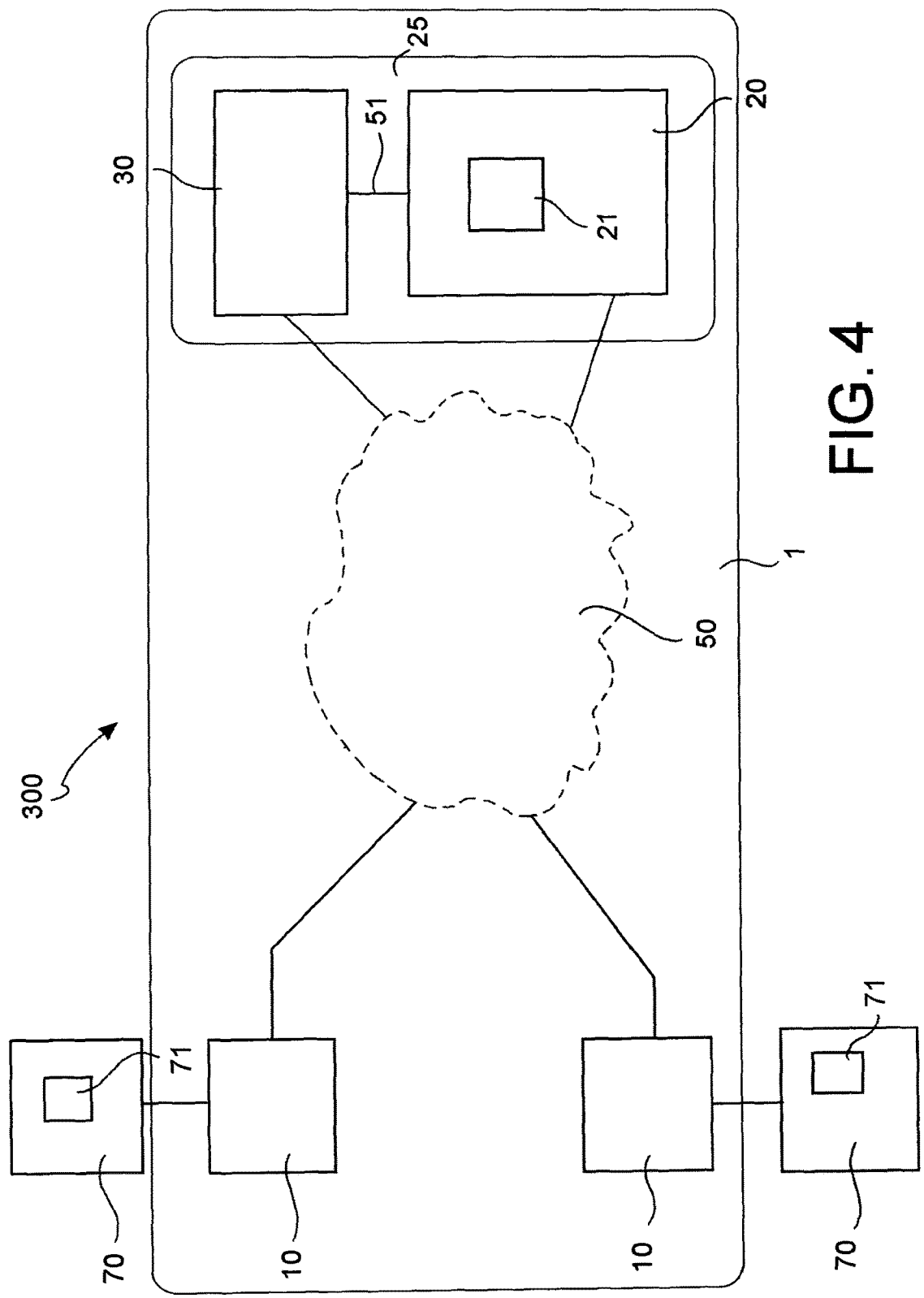

With reference to FIG. 4, an access system to a public transportation station 300 is now described, for example a station of a city subway network, where such an access is conditional to the recognition of a registered user, for example at turnstiles when entering the station.

Such access system to a public transportation subway station comprises a station access device 70, comprising station access processing means 71 configured to deliver an access service to a subway station, and moreover a system 1 for the quick recognition of a user according to the embodiments already described above.

In the recognition system 1, the recognition processing means 21 are further configured to send to the recognition terminal 10 an indication of recognition or non-recognition of the user.

The recognition terminal 10 is co-located with and operatively connected to the station access device (70) to transmit to the station access processing means (71) such indication of recognition or non-recognition.

Furthermore, the station access processing means (71) are configured to allow the access to the subway station only if they have received such indication of recognition.

It can be noticed that the object of the present invention is achieved by the method and the systems and methods described above.

In fact, based on what has been illustrated above, it shall be apparent that the method according to the invention is capable, based on an easy and rapid procedure of acquisition of biometric data, to perform a quick and reliable recognition of a user of a service among many registered users, by virtue of its characteristics.

Particularly, from the description above, the advantages of using localization information (for example, geolocation or positioning), relating it to information about the localization of the recognition terminals, in the context of a recognition method based on biometric data, are apparent.

For example, in the most frequent case, where there is a number of recognition terminals distributed in a territory, the recognition identification code is compared with a reduced subset of comparison identification codes, especially prepared for each recognition terminal, and comprising the registered identification codes of those registered users who are in the proximity of the recognition terminal. This considerably reduces the number of comparisons to be performed before getting the recognition, and drastically accelerates the recognition process.

As a further example, the method embodiment is considered, in which the comparison is performed by following the iterative rule of performing first the comparison between the identification recognition code and the comparison identification code, not yet compared, corresponding to the geolocalizable (or connected) registered user who is nearest to the recognition terminal. In such a case, not only a "comparison set" of the recognition terminal (subset of the set of all the registered users) is defined, but, within this subset, the comparisons are performed with the codes of those users who are nearest to the recognition terminal. This may also lead to immediately select the "correct" comparison code (the one of the user who is located very near to the recognition terminal, to which he/she is actually going), in the case that there are no other registered users in the immediate proximity, which, in turn may even lead to a first-attempt recognition.

Therefore, the method performance, in terms of speed and reliability, that can be obtained by virtue of the above-mentioned characteristics, makes it applicable for the recognition of a user among hundreds of thousands, or even millions, of users, with a high level of recognition reliability. This allows the method and the recognition system of the invention to be suitably applied to a wide range of service-delivering systems, such as POS and/or ATM services, and other validated access services, thus meeting needs that are emerging in an important manner.

To the embodiments of the registration and recognition method, of the service delivery method, of the system for the recognition of a user of a service, and of service delivery apparatuses, according to the invention, described above, those of ordinary skill in the art, in order to meet contingent needs, will be able to make modifications, adaptations, and replacements of elements with functionally equivalent other ones, also together with the prior art, also creating hybrid implementations, without departing from the scope of the following claims. Each of the characteristics described as belonging to a possible embodiment may be implemented independently from the other embodiments described.

It shall be further noticed that the term "comprising" does not exclude other elements or steps, the term "a/an" or "one" does not exclude a plurality. Furthermore, the Figures are not necessarily in scale; on the contrary, importance is generally given to the illustration of the principles of the present invention.

The invention claimed is:

1. A method of registration and quick recognition of a user of a service, through identification codes derivable from biometric data, by at least one recognition terminal, having a respective known localization, the method comprising the steps of:
 a. registering a user, through a respective registration event comprising:
  acquiring from the user to be registered at least one biometric datum;
  encoding, by a coding procedure, the at least one acquired biometric datum into a respective registration identification code;
  associating the registration identification code to the user to be registered;
  registering the user as a registered user, and the associated registration identification code as a registration identification code of the registered user;
 b. preparing and associating to each of the at least one recognition terminal a respective comparison set, comprising a plurality of comparison identification codes, each of the plurality of comparison identification codes corresponding to a registration identification code of a respective user registered in a previous registration event;
 c. recognizing a registered user, among a plurality of registered users, by one of the at least one recognition terminal, through a respective recognition event, comprising:
  acquiring from the user to be recognized said at least one biometric datum;
  encoding, by said coding procedure, the at least one acquired biometric datum into a respective recognition identification code of the user to be recognized;
  comparing the recognition identification code with each of the comparison identification codes of the comparison set associated to said one of the at least one recognition terminal;
  estimating, for each comparison, a respective matching level;
  recognizing or refusing recognition of the user to be recognized based on the estimated matching levels;
 wherein, for each of the at least one recognition terminal, the step of preparing and associating comprises:
  acquiring user localization information from registered users, said user localization information comprising information on real-time position of the user;
  estimating a distance of each of the localized registered users from said recognition terminal based on said acquired user localization information and the known localization of said recognition terminal;
  selecting the plurality of comparison identification codes, among the registered identification codes, for said recognition terminal, based on said estimated distances of the localized users from said recognition terminal; and
 wherein in said step of recognizing a registered user, the step of comparing the recognition identification code comprises:

comparing the recognition identification code with the comparison identification codes according to an order based on said estimated distances of the localized users from said recognition terminal;

wherein each of the at least one recognition terminal is connected to a management center, in which the localization of each of the at least one recognition terminal is stored, wherein the step of registering a user further comprises providing a geolocation-module, associable to the registered user, configured to provide real-time geolocation information of the registered user; and wherein in the step of preparing and associating to each of the at least one recognition terminal a respective comparison set:

the step of acquiring comprises receiving and processing, by the management center, the geolocation information of geolocalizable registered users, to determine said localization of each geolocalizable registered user;

the step of estimating comprises comparing, by the management center, each of the localizations of the geolocalizable registered users and the known localization of the recognition terminal;

the step of selecting comprises selecting the plurality of comparison identification codes, among all the registered identification codes, based on said comparison.

2. The method according to claim 1, wherein the step of providing a geolocation module, associable to the registered user, comprises:

providing a client application program loadable on a mobile user terminal provided with geolocation functions, said client application program being configured to acquire geolocation information and to send said geolocation information to the management center;

arranging a server application program, in the management center, configured to receive geolocation information from the mobile user terminal, to recognize the respective user of the mobile terminal, to check whether the user is a registered user, and, if so, to associate the received geolocation information to the user registration identification code.

3. The method according to claim 1, wherein the known localization of each of the at least one recognition terminal is defined in terms of geographic coordinates of said recognition terminal, and wherein the step of comparing comprises:

determining the localization of a user, based on the respective localization information received, in terms of geographic coordinates of the user;

calculating the distance of each user from each of the at least one recognition terminal, said distance being calculated based on the geographic coordinates of the user and the geographic coordinates of the recognition terminal; and wherein the step of selecting the comparison identification codes, associated to a recognition terminal, comprises selecting the identification registration codes of the registered users for which said distance from the recognition terminal is less than a pre-settable threshold distance.

4. A system for quick recognition of a user of a service, by identification codes derivable from biometric data, comprising:

a. at least one recognition terminal, having a respective known localization, comprising:

a biometric data acquirer, configured to acquire at least one user biometric datum;

a recognition terminal processor, operatively connected to the biometric data acquirer, to receive the at least one acquired biometric datum, and configured to encode the at least one acquired biometric datum into a recognition identification code of the user, at a recognition event of the user;

b. storage, configured to store a plurality of registered registration identification codes, associated to respective users registered by previous registration events;

c. a recognition apparatus, operatively connected to each of said at least one recognition terminal, to receive the recognition identification code generated by the recognition terminal, and further operatively connected to the storage to access the registered registration identification codes, said recognition apparatus comprising a recognition processor, configured to:

acquire user localization information from registered users, said user localization information comprising information on real-time position of the user;

estimate a distance of each of the localized registered users from the recognition terminal from which the recognition identification code comes, said distance estimation being based on said acquired user localization information and the known localization of the recognition terminal;

select a plurality of comparison identification codes, among the registered identification codes, for said recognition terminal, based on said estimated distances of the localized users from the recognition terminal;

prepare and associate to each of the at least one recognition terminal a respective comparison set, comprising said selected plurality of comparison identification codes;

compare, according to an order based on said estimated distances of the localized users from said recognition terminal, the recognition identification code with each of the comparison identification codes of the comparison set of said recognition terminal from which the recognition identification code comes;

estimate, for each of said comparisons, a respective matching level;

recognize or refuse recognition of the user to be recognized based on the estimated matching levels;

a geolocation module, associable to the registered user, configured to provide real-time geolocation information of the registered user, wherein storage is further configured to store the localization of each of the at least one recognition terminal, and wherein the recognition processor is further configured to:

receive and process the geolocation information of geolocalizable registered users, to establish in real time the localization of each geolocalizable registered user;

compare each of the localizations of the geolocalizable registered users with the localization of the recognition terminal from which the recognition identification code comes;

select the plurality of comparison identification codes, among all the registered identification codes, based on said comparison.

5. The system according to claim 4, wherein the geolocation module comprises a client application program suitable to be executed on a mobile user terminal provided with geolocation functions and suitable to be connected to a mobile network, said client application program being configured to acquire geolocation information and to send said geolocation information to the recognition apparatus; and wherein the system further comprises a server application program, suitable to be executed by the recognition processor, said server application program being configured to receive geolocation information from the mobile user terminal, to recognize the respective user of the mobile terminal, to check whether the user is a registered user, and, if so, to associate the received geolocation information to the registration identification code of the user.

6. The system according to claim 5, wherein the mobile user terminal comprises a satellite-navigation-based localization device, and wherein the client application program acquires geolocation information from said satellite-navigation-based localization device, or wherein the client application program is configured to acquire geolocation information from the mobile network to which the mobile user terminal is connectable, or wherein the client application program is configured to associate a user alphanumeric code to the geolocation information to be sent to the recognition apparatus, and the server application program is configured to recognize the user based on said user alphanumeric code.

7. The system according to claim 5, wherein the client application program is provided with a module for activating or deactivating the sending of geolocation information, so that the registered user can select, in each moment, whether he/she is a geolocalizable registered user or not.

8. A service delivery system for delivering services conditional to recognition of a registered user, comprising:
a service delivery device, comprising a service delivery processor configured to deliver a service;
a system for quick recognition of a user comprising:
a. at least one recognition terminal, having a respective known localization, comprising:
a biometric data acquirer, configured to acquire at least one user biometric datum;
a recognition terminal processor, operatively connected to the biometric data acquirer, to receive the at least one acquired biometric datum, and configured to encode the at least one acquired biometric datum into a recognition identification code of the user, at a recognition event of the user;
b. storage, configured to store a plurality of registered registration identification codes, associated to respective users registered by previous registration events;
c. a recognition apparatus, operatively connected to each of said at least one recognition terminal, to receive the recognition identification code generated by the recognition terminal, and further operatively connected to the storage to access the registered registration identification codes, said recognition apparatus comprising a recognition processor, configured to:
acquire user localization information from registered users, said user localization information comprising information on real-time position of the user;
estimate a distance of each of the localized registered users from the recognition terminal from which the recognition identification code comes, said distance estimation being based on said acquired user localization information and the known localization of the recognition terminal;
select a plurality of comparison identification codes, among the registered identification codes, for said recognition terminal, based on said estimated distances of the localized users from the recognition terminal;
prepare and associate to each of the at least one recognition terminal a respective comparison set, comprising said selected plurality of comparison identification codes;
compare, according to an order based on said estimated distances of the localized users from said recognition terminal, the recognition identification code with each of the comparison identification codes of the comparison set of said recognition terminal from which the recognition identification code comes;
estimate, for each of said comparisons, a respective matching level;
recognize or refuse recognition of the user to be recognized based on the estimated matching levels;
wherein the recognition processor is further configured to send to the recognition terminal an indication of recognition or non-recognition of the user;
wherein the recognition terminal is co-located with and operatively connected to the service delivery device to transmit to the service delivery processor of the service delivery device said indication of recognition or non-recognition; and
wherein the service delivery processor is configured to deliver the service only if the processor has received said indication of recognition;
a geolocation module, associable to the registered user, configured to provide real-time geolocation information of the registered user, wherein storage is further configured to store the localization of each of the at least one recognition terminal, and
wherein the recognition processor is further configured to:
receive and process the geolocation information of geolocalizable registered users, to establish in real time the localization of each geolocalizable registered user;
compare each of the localizations of the geolocalizable registered users with the localization of the recognition terminal from which the recognition identification code comes;
select the plurality of comparison identification codes, among all the registered identification codes, based on said comparison.

9. The service delivery system according to claim 8, wherein the service delivery system is a POS system, the services are POS services, the service delivery device is a POS device , the service delivery processor is a POS processor.

10. The service delivery system according to claim 8, wherein the service delivery system is an ATM system, the services are ATM services, the service delivery device is an ATM device, the service delivery processor is an ATM processor.

11. The service delivery system according to claim 8, wherein the service delivery system is an access system to a public transportation subway station, the services are an access to a subway station conditional to the recognition of a registered user, the service delivery device is a station access device, the service delivery processor is a station access processor.

12. A method of registration and quick recognition of a user of a service, through identification codes derivable from biometric data, by at least one recognition terminal, having a respective known localization, the method comprising the steps of:
  a. registering a user, through a respective registration event comprising:
    acquiring from the user to be registered at least one biometric datum;
    encoding, by a coding procedure, the at least one acquired biometric datum into a respective registration identification code;
    associating the registration identification code to the user to be registered;
    registering the user as a registered user, and the associated registration identification code as a registration identification code of the registered user;
  b. preparing and associating to each of the at least one recognition terminal a respective comparison set, comprising a plurality of comparison identification codes, each of the plurality of comparison identification codes corresponding to a registration identification code of a respective user registered in a previous registration event;
  c. recognizing a registered user, among a plurality of registered users, by one of the at least one recognition terminal, through a respective recognition event, comprising:
    acquiring from the user to be recognized said at least one biometric datum;
    encoding, by said coding procedure, the at least one acquired biometric datum into a respective recognition identification code of the user to be recognized;
    comparing the recognition identification code with each of the comparison identification codes of the comparison set associated to said one of the at least one recognition terminal;
    estimating, for each comparison, a respective matching level;
    recognizing or refusing recognition of the user to be recognized based on the estimated matching levels;
  wherein, for each of the at least one recognition terminal, the step of preparing and associating comprises:
    acquiring user localization information from registered users, said user localization information comprising information on real-time position of the user;
    estimating a distance of each of the localized registered users from said recognition terminal based on said acquired user localization information and the known localization of said recognition terminal;
    selecting the plurality of comparison identification codes, among the registered identification codes, for said recognition terminal, based on said estimated distances of the localized users from said recognition terminal; and
  wherein in said step of recognizing a registered user, the step of comparing the recognition identification code comprises:
    comparing the recognition identification code with the comparison identification codes according to an order based on said estimated distances of the localized users from said recognition terminal;
  wherein each of the at least one recognition terminal is connected to a management center, in which the localization of each of the at least one recognition terminal is stored, and
  wherein the step of registering a user further comprises providing a connector, associable to the registered user, configured to allow a connection of the registered user to a telecommunication network comprising a network control center, capable of detecting positioning information of connected registered users, and operatively connected to the management center, and
  wherein in the step of preparing and associating to each of the at least one recognition terminal a respective comparison set:
  the step of acquiring comprises:
    detecting, by the network control center, for each connected registered user, respective positioning information;
    communicating to the management center, by the network control center, said positioning information for each registered user;
    processing, by the management center, said positioning information, to establish in real time said localization of each connected registered user;
  the step of estimating comprises comparing, by the management center, each of the localizations of the connected registered users and the known localization of the recognition terminal;
  the step of selecting comprises selecting the plurality of comparison identification codes, among all the registered identification codes, based on said comparison.

13. The method according to claim 12, wherein said telecommunication network is a wireless access network provided with a plurality of access points, and wherein said step of detecting positioning information comprises:
  identifying the access point to which a user is connected;
  determining the positioning information of said user based on the access point to which the user is connected.

14. The method according to claim 13, wherein at least one recognition terminal is associated to a respective access point, and wherein the step of selecting the comparison identification codes, associated to a recognition terminal, comprises:
  assigning the registration identification code of each of the registered users to the comparison set of the recognition terminal associated to the access point to which the user is connected.

15. The method according to claim 12, wherein the step of comparing comprises:
  determining the localization of a user, based on the respective localization information, in terms of a presence of the user within a user access area, associated to an access point to a telecommunication network the user is connected to;
  comparing the known localization of each of the at least one recognition terminal with said user localization.

16. The method according to claim 15, implemented by a plurality of recognition devices, and wherein the step of selecting the comparison identification codes, associated to a recognition terminal, comprises:
  assigning the registration identification code of each of the registered users to the comparison set of the recognition terminal that is located at a shortest distance from the user access area.

17. The method according to claim 12, wherein the comparison is performed by following the iterative rule of performing with priority to comparison between the recognition identification code and the identification comparison code, not yet compared, corresponding to the geolocalizable or connected registered user who is located nearest to the recognition terminal.

18. The method according to claim 12, comprising, after the step of recognizing or refusing recognition, the further step of:
providing to a service delivery apparatus an indication of recognition or non-recognition of the user;
if the user has been recognized as one of the registered users, further providing to the service delivery apparatus an indication of the identity of the recognized user; and
wherein the service is a POS service or an ATM service or a service for accessing a public transportation subway station.

19. A system for quick recognition of a user of a service, by identification codes derivable from biometric data, comprising:
a. at least one recognition terminal, having a respective known localization, comprising:
a biometric data acquirer, configured to acquire at least one user biometric datum;
a recognition terminal processor, operatively connected to the biometric data acquirer, to receive the at least one acquired biometric datum, and configured to encode the at least one acquired biometric datum into a recognition identification code of the user, at a recognition event of the user;
b. storage, configured to store a plurality of registered registration identification codes, associated to respective users registered by previous registration events;
c. a recognition apparatus, operatively connected to each of said at least one recognition terminal, to receive the recognition identification code generated by the recognition terminal, and further operatively connected to the storage to access the registered registration identification codes, said recognition apparatus comprising a recognition processor, configured to:
acquire user localization information from registered users, said user localization information comprising information on real-time position of the user;
estimate a distance of each of the localized registered users from the recognition terminal from which the recognition identification code comes, said distance estimation being based on said acquired user localization information and the known localization of the recognition terminal;
select a plurality of comparison identification codes, among the registered identification codes, for said recognition terminal, based on said estimated distances of the localized users from the recognition terminal;
prepare and associate to each of the at least one recognition terminal a respective comparison set, comprising said selected plurality of comparison identification codes;
compare, according to an order based on said estimated distances of the localized users from said recognition terminal, the recognition identification code with each of the comparison identification codes of the comparison set of said recognition terminal from which the recognition identification code comes;
estimate, for each of said comparisons, a respective matching level;
recognize or refuse recognition of the user to be recognized based on the estimated matching levels;

a telecommunication network comprising a network control center, capable of detecting positioning information of connected registered users, and operatively connected to said recognition apparatus, and
a connector, associable to the registered user, configured to allow a connection of the registered user to said telecommunication network;
wherein the storage is further configured to store the localization of each of the at least one recognition terminal, and
wherein the recognition processor is further configured to:
receive and process the positioning information of connected registered users, to determine in real time the localization of each connected registered user;
compare each of the localizations of the connected registered users with the localization of the recognition terminal from which the recognition identification code comes;
select the plurality of comparison identification codes, among all the registered identification codes, based on said comparison.

20. The system according to claim 19, wherein the telecommunication network is a wireless access network provided with a plurality of access points, and wherein said network control center is further configured to identify the wireless access point to which a user is connected; and to determine the positioning information of said user based on the wireless access point to which the user is connected.

21. A service delivery system for delivering services conditional to recognition of a registered user, comprising:
a service delivery device, comprising a service delivery processor configured to deliver a service;
a system for quick recognition of a user comprising:
a. at least one recognition terminal, having a respective known localization, comprising:
a biometric data acquirer, configured to acquire at least one user biometric datum;
a recognition terminal processor, operatively connected to the biometric data acquirer, to receive the at least one acquired biometric datum, and configured to encode the at least one acquired biometric datum into a recognition identification code of the user, at a recognition event of the user;
b. storage, configured to store a plurality of registered registration identification codes, associated to respective users registered by previous registration events;
c. a recognition apparatus, operatively connected to each of said at least one recognition terminal, to receive the recognition identification code generated by the recognition terminal, and further operatively connected to the storage to access the registered registration identification codes, said recognition apparatus comprising a recognition processor, configured to:
acquire user localization information from registered users, said user localization information comprising information on real-time position of the user;
estimate a distance of each of the localized registered users from the recognition terminal from which the recognition identification code comes, said distance estimation being based on said acquired user localization information and the known localization of the recognition terminal;
select a plurality of comparison identification codes, among the registered identification codes, for said recognition terminal, based on said estimated distances of the localized users from the recognition terminal;

prepare and associate to each of the at least one recognition terminal a respective comparison set, comprising said selected plurality of comparison identification codes;

compare, according to an order based on said estimated distances of the localized users from said recognition terminal, the recognition identification code with each of the comparison identification codes of the comparison set of said recognition terminal from which the recognition identification code comes;

estimate, for each of said comparisons, a respective matching level:

recognize or refuse recognition of the user to be recognized based on the estimated matching levels;

wherein the recognition processor is further configured to send to the recognition terminal an indication of recognition or non-recognition of the user;

wherein the recognition terminal is co-located with and operatively connected to the service delivery device to transmit to the service delivery processor of the service delivery device said indication of recognition or non-recognition; and wherein the service delivery processor is configured to deliver the service only if the processor has received said indication of recognition;

a telecommunication network comprising a network control center, capable of detecting positioning information of connected registered users, and operatively connected to said recognition apparatus, and a connector, associable to the registered user, configured to allow a connection of the registered user to said telecommunication network;

wherein the storage is further configured to store the localization of each of the at least one recognition terminal, and wherein the recognition processor is further configured to:

receive and process the positioning information of connected registered users, to determine in real time the localization of each connected registered user;

compare each of the localizations of the connected registered users with the localization of the recognition terminal from which the recognition identification code comes;

select the plurality of comparison identification codes, among all the registered identification codes, based on said comparison.

22. The service delivery system according to claim 21, wherein the service delivery system is a POS system, the services are POS services, the service delivery device is a POS device , the service delivery processor is a POS processor.

23. The service delivery system according to claim 21, wherein the service delivery system is an ATM system, the services are ATM services, the service delivery device is an ATM device, the service delivery processor is an ATM processor.

24. The service delivery system according to claim 21, wherein the service delivery system is an access system to a public transportation subway station, the services are an access to a subway station conditional to the recognition of a registered user, the service delivery device is a station access device, the service delivery processor is a station access processor.

\* \* \* \* \*